United States Patent [19]

Takahashi et al.

[11] Patent Number: 5,000,784
[45] Date of Patent: Mar. 19, 1991

[54] METHOD FOR SMELTING REDUCTION OF IRON ORE

[75] Inventors: Kenji Takahashi; Katsuhiro Iwasaki; Shigeru Inoue; Haruyoshi Tanabe; Masahiro Kawakami; Kenzo Yamada; Osamu Terada, all of Tokyo, Japan

[73] Assignee: NKK Corporation, Tokyo, Japan

[21] Appl. No.: 276,612

[22] Filed: Nov. 28, 1988

[30] Foreign Application Priority Data

Nov. 30, 1987 [JP] Japan .................. 62-303940
Feb. 9, 1988 [JP] Japan .................. 63-28584
Feb. 9, 1988 [JP] Japan .................. 63-28586

[51] Int. Cl.$^5$ ........................ C21B 11/08
[52] U.S. Cl. ........................ 75/501; 75/502
[58] Field of Search ............... 75/38, 40, 59.25

[56] References Cited

U.S. PATENT DOCUMENTS 3,711,275 1/1973 Johnsson ........................ 75/40
4,504,311 3/1985 Weiner ........................ 266/219

FOREIGN PATENT DOCUMENTS 58-144407 8/1983 Japan ........................ 75/38
61-43406 9/1986 Japan .

Primary Examiner—Melvyn J. Andrews
Attorney, Agent, or Firm—Frishauf, Holtz, Goodman & Woodward

[57] ABSTRACT

A method for smelting reduction of iron ore comprises the steps of: preheating and prereducing iron ore; charging said preheated and prereduced iron ore, carbonaceous material and flux into a smelting reduction furnace; blowing oxygen gas through a top blow oxygen lance having decarburizing nozzles and post-combustion nozzles into said smelting reduction furnace, an end of said top blow oxygen lance being arranged between an upper side level of a slag layer and a lower side level of said slag layer; blowing a stirring gas through at least one side tuyere placed in side wall of said smelting furnace and at least one bottom tuyer placed in bottom wall of said reduction furnace so that at least part of said stirring gas introduced through at least one said side tuyere hits a swollen portion of the molten metal by said stirring gas introduced through at least one said bottom tuyere; and controlling a flow rate of said oxygen gas and said stirring gas blown in said smelting reduction furnace so that an OD of infurnace gas of said smelting reduction furnace ranges 0.5 to 1.0, where said OD is represented by the following formula: $OD = (H_2O + CO_2)/(H_2 + H_2O + CO + CO_2)$. And, further, an apparatus used in the above-mentioned method.

20 Claims, 3 Drawing Sheets

METHOD FOR SMELTING REDUCTION OF IRON ORE

BACKGROUND OF THE INVENTION

1. Field of the Invention

The present invention relates to a method for smelting reduction of iron ore, and particularly to a method wherein carbonaceous material is used as both a fuel and a reducing agent for the iron ore which is being smelted and reduced in a basic oxygen furnace and an apparatus therefor.

2. Description of the Related Arts

Smelting reduction method has recently been developed as a substitution for a blast furnace iron-making method, to overcome some disadvantages in that the blast furnace iron-making method requires not only an expensive construction cost but also a vast construction site.

In a prior art smelting reduction method, iron ore is prereduced by means of an exhaust gas, and then the prereduced iron ore is charged together with carbonaceous material and flux into a smelting reduction furnace. Furthermore, oxygen gas and stirring gas are blown into the smelting reduction furnace. Thus, the carbonaceous materials are consumed thanks to the precharged molten metal and, at the same time, C contained in the carbonaceous material is oxidized by the oxygen gas. Through the heat produced by this oxidation, the ore is smelted and reduced by means of C contained in the carbonaceous materials. CO gas generating in the molten metal is post-combusted, by in excess of the oxygen gas, into $CO_2$ gas. The sensible heat of this $CO_2$ gas is transferred to slag and iron particles in the slag covering the surface of the molten metal, and then, to the molten metal.

In this way, the iron ore is reduced to the molten metal. In this process, in order to lighten the load of reduction process in a smelting reduction furnace, iron ore is prereduced, for example, at a reduction degree of 60 to 75% before the iron ore is charged into the smelting reduction furnace as disclosed in Japanese Examined Patent Publication No. 43406/86. Resultantly, an exhaust gas from the smelting reduction furnace becomes a with a low degree of oxidation gas which is highly reducing and a large amount of the exhaust gas is required.

If iron ore before being charged into the smelting reduction furnace is prereduced at a ratio of at least 30% for the purpose of the lightening the load of reduction process of smelting reduction furnace, the oxidation degree (hereinafter referred to as "OD") of the exhaust gas from the smelting reduction furnace, where the OD is represented by the formula of "$(H_2O + CO_2)/(H_2 + H_2O + CO + CO_2)$" is required to be lowered. Resultantly the amount of the exhaust gas is necessarily increased, as shown, for example, in the Japanese Examined Patent Publication No. 43406/86. This increase of the exhaust gas, naturally, increases the production cost. Consequently, to obtain the high prereduction ratio of the iron ore, exhaust gas having a low OD as explained above is required, and still the retention time of the iron ore in the prereduction furnace has to become longer than that in the smelting reduction furnace. Therefore, it becomes difficult to control the balancing of cycles of charge of the prereduced iron ore and discharge of the produced molten metal. This necessarily results in restricting control range strictly in the smelting reduction furnace.

Furthermore, in order to raise the melting speed of iron ore and to obtain the speed-up of reduction of the iron ore, a method of post-combusting CO gas in the smelting reduction furnace and making use of the heat generated therefrom has conventionally been employed, wherein $O_2$ gas for post-combustion is introduced through tuyeres placed at upper wall of the smelting reduction furnace. However, in the conventional method, although the temperature of the exhaust gas can be elevated when the ratio of the post combustion is raised, the sensible heat transfer to the molten metal is not sufficient. This results in being forced to discharge high temperature exhaust gas. This method has a difficulty in that such a high temperature gas will attack the inner refractory wall of the smelting reduction furnace.

Therefore, it has been hitherto generally conceived that the OD of the exhaust gas cannot be raised so much.

SUMMARY OF THE INVENTION

In the light of the mentioned difficulty, it is an object of the present invention to provide a method for smelting reduction of iron ore wherein an efficiency of heat transfer is attained, the inner refractory wall is well protected from the heat attack due to the post-combusted $CO_2$, an efficient preheat and prereduction is obtained and a reasonable operational performance is guaranteed.

In accordance with the present invention, a method is provided for smelting reduction of iron ore, comprising the steps of:

preheating and prereducing iron ore;

charging the preheated and prereduced iron ore, carbonaceous material and flux into a smelting reduction furnace;

blowing oxygen gas through a top blow oxygen lance having decarburizing nozzles and post-combustion nozzles into the smelting reduction furnace, an end of said top blow oxygen lance being arranged between an upper level of and a lower level of a slag layer;

blowing a stirring gas through at least one side tuyere placed at the side wall of the smelting reduction furnace and at least one bottom tuyere placed at the bottom wall of the reduction furnace so that at least a part of the stirring gas introduced through the at least one side tuyere hits a swollen portion of the molten metal which is made by the stirring gas introduced through the at least one bottom tuyere;

said stirring gas being at least one selected from the group consisting of Ar, $N_2$, CO, $CO_2$ and a process gas;

controlling the flow rate of the oxygen gas and the stirring gas blown in the smelting reduction furnace so that OD of the infurnace gas generated from the smelting reduction furnace ranges 0.5 to 1.0.

Furthermore, in accordance with the present invention, an apparatus for the mentioned method is provided, comprising:

a preheat and prereduction furnace which preheats and prereduces iron ore;

a smelting reduction furnace into which the preheated and prereduced iron ore, carbonaceous material and flux are charged and in which the iron ore is smelted and reduced;

a top blow oxygen lance having decarburizing nozzles and post-combustion nozzles and blowing oxygen gas into said smelting reduction furnace;

at least one side tuyere placed at a side wall of the smelting reduction furnace and at least one bottom tuyere placed at a bottom of the smelting reduction furnace through which a stirring gas is respectively blown so that at least a part of said stirring gas introduced through said at least one side tuyere hits a swollen portion of the molten metal by said at least one bottom tuyere.

The object and other objects and advantages of the present invention will become apparent from the detailed description to follow, taken in conjunction with the appended drawings.

DESCRIPTION OF THE PREFERRED EMBODIMENT

Figure 1:
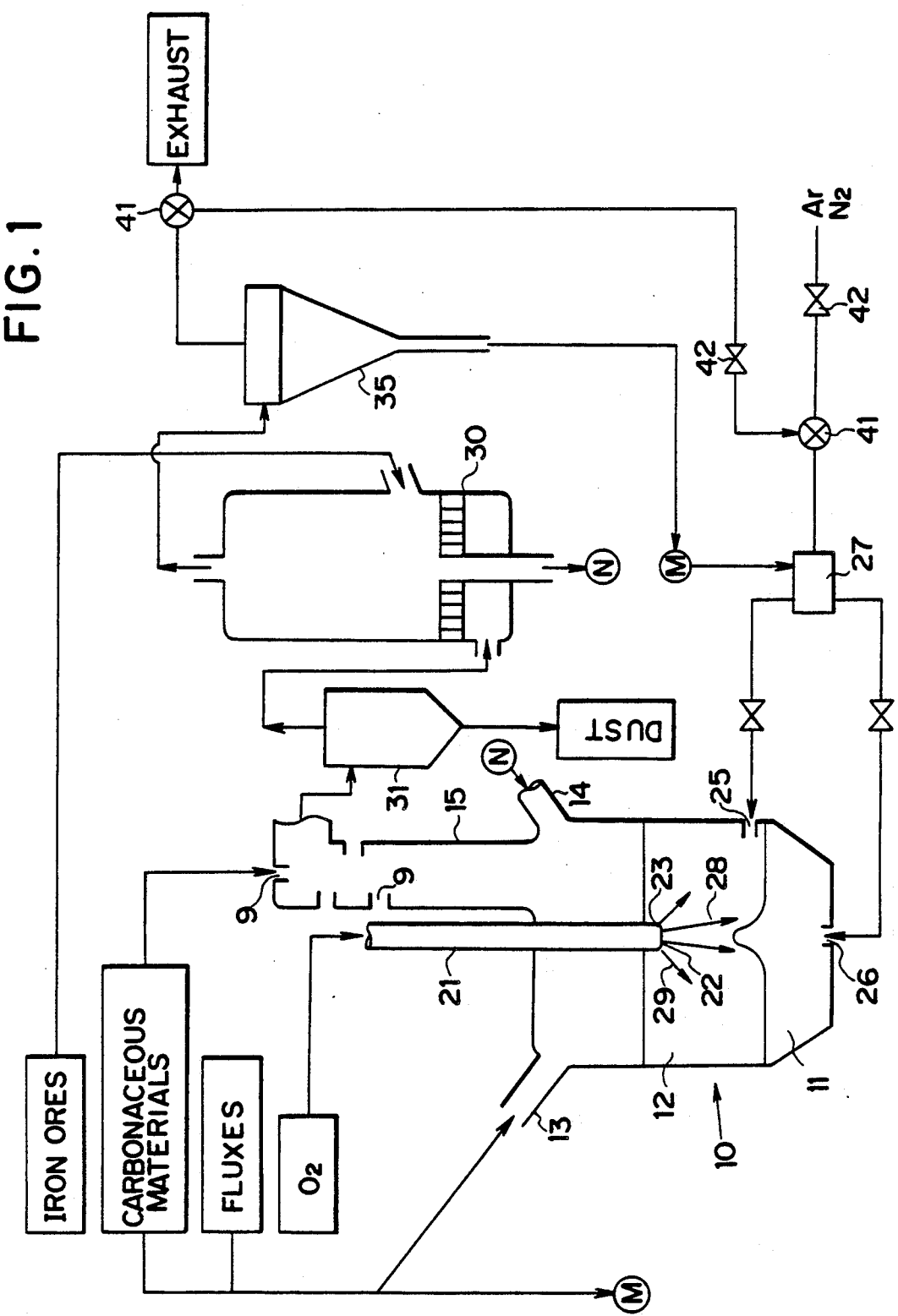
FIG. 1 is a block diagram illustrating an embodiment of an apparatus for smelting reduction of iron ore of the present invention.

The inventors obtained some findings, based on the study of the mechanism of the smelting reduction furnace and the measures specifically responding to improvement in the heat transfer efficiency and to promotion of the reduction of iron ore.

1. According to the basic concept in the prior arts as mentioned above, the post-combustion ratio cannot be greatly improved due to the technological limit in improving the heat transfer efficiency and damage of the inner walls of the smelting reduction furnace due to the post-combustion super heat. However, if oxygen gas is blown into a slag layer and, at the same time, the slag is strongly stirred so that the post-combustion is performed mainly within the slag layer, the high degree of post-combustion can be procured, the high heat transfer efficiency being maintained. Thus, thanks to the high degree of post-combustion, slag and molten metal shots contained in slag are well heat-supplied so that the reduction of iron ore by $\underline{C}$ represented in the formula given below proceeds efficiently, where $\underline{C}$ means carbon contained in the molten metal, either in shape of metal droplets or metal bath.

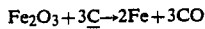

$$Fe_2O_3 + 3\underline{C} \rightarrow 2Fe + 3CO$$

2 In the prior art method, there are some examples wherein the oxygen bottom blow is carried out during the whole or a certain period of the reduction operation. Such oxygen bottom blow is disadvantageous to the high degree of post-combustion. Namely, when the oxygen bottom blow is carried out, a large amount of CO gas is produced in molten metal and the molten metal is strongly stirred. Resultantly, splash of the molten metal goes into the post-combustion zone and $\underline{C}$ contained in the splashed molten metal reacts with the oxygen gas, thereby the post-combustion ratio being lowered. Consequently, it is necessary to avoid the oxygen bottom blow, regardless of the period of the blowing.

Based on these knowledge and experience, the present invention enables an efficient reduction operation, setting the following conditions:

(a) Side blowing and bottom blowing of stirring gas are combined so that molten metal is actively diffused into the zone where iron ore exists in the slag layer and the reduction work of iron ore by $\underline{C}$ contained in the molten metal is promoted.

(b) Decarburization nozzles and post-combustion nozzles are placed in a top blow oxygen lance and oxygen gas is blown therethrough so that a predetermined OD level or a high level is procured. The oxygen gas through the post-combustion nozzles is introduced into the slag layer to form, in the slag layer, a zone where the post-combustion is carried out. The slag layer is strongly stirred by a side blow gas as well as by a top blow gas. Thus, the heat generated by the post-combustion is transferred to iron ore.

(c) As stirring gas blown, through the side wall as well as bottom wall, at least one selected from the group consisting of Ar, $N_2$, CO, $CO_2$ and a process gas is used so that the post-combustion degree does not go down. Oxygen gas is not used for this purpose.

In addition to the foregoing, in the present invention, powdery carbonaceous material, fuel oil or steam is blown through an upside wall portion or an upper portion of side walls of the smelting reduction furnace, a gas exhaust pipe for an exhaust gas provided with the reduction furnace or gas upgrading tuyeres at a preheat and prereduction furnace. This blowing upgrades gases generated in the smelting reduction furnaces by lowering the OD of the generated in furnace gases, and those upgraded gases contribute to a high prereduction degree. The temperature of the exhaust gas is controlled to the preferred range of 300° to 1,300° C. If the temperature is less than 300° C., the preheat effect is not expected and in addition, it fears that tar trouble occurs during the process of upgrading the gases. Contrarily, if it is over 1,300° C., there is a problem of heat resistance of the equipment. Furthermore, it is also advantageous in the heat resistance of the equipment to lower the temperature by means of upgrading the gases.

Now referring specifically to the appended drawings, an embodiment of an apparatus for smelting reduction of iron ore of the present invention will be described. FIG. 1 illustrates a block diagram of an apparatus for smelting reduction of iron ore of the present invention. In FIG. 1, the two M s mean that one of the two M s is connected to the other and two N s mean that one of the two N s is connected to the other. In smelting reduction furnace 10, molten metal bath 11 and slag layer 12 are formed. The smelting reduction furnace has top blow oxygen lance 21 inserted down perpendicularly into it. At the end of the top blow oxygen lance, decarburizing nozzles 22 and post-combustion nozzles 23 are placed to blow oxygen gas into furnace 10. In side walls and a bottom wall of furnace 10, there are respectively placed side tuyere 25 and bottom tuyere 26 through which a gas is blown as stirring gas. The gas is at least one selected from the group consisting of Ar, $N_2$, CO, $CO_2$ and a process gas. The process gas is a gas generated from an apparatus for smelting and reducing iron ore according to the present invention.

At upper portions of furnace 10, first chute 13 and second chute 14 are respectively mounted. Through first chute 13, carbonaceous material and flux which are supplied from an ordinary material feeder (not shown for simplification), and through second chute 14, iron ore which is already prereduced in fluid bed type preheat and prereduction furnace 30, are respectively charged, by gravity, into the smelting reduction furnace. Gas exhaust pipe 15 for an exhaust gas discharged from furnace 10 is attached thereto. It should be noted that the fluid bed type preheat and prereduction furnace can be alternated by a shaft type furnace having a high heat efficiency or by a rotary kiln type furnace enabling an equipment cost reduction and an easy operation without any obstacle to the performance of the present invention.

At upper portions of said gas exhaust pipe, one or more gas upgrading tuyeres 9 are placed, through which powdery carbonaceous material, fuel oil or steam is blown, as a gas upgrading agent which upgrades the exhaust gas into a gas having a low OD value. Furthermore, an exhaust gas is introduced into hot cyclone 31 from smelting reduction furnace 10 and removes dust from the exhaust gas without losing the high heat of the exhaust gas, preheat and prereduction furnace 30, into which the exhaust gas is introduced and which preheats iron ore by means of the introduced exhaust gas, and separator 35 which receives the exhaust gas from the preheat and prereduction furnace and removes fine particles of the iron ore included in the exhaust gas. There is also pressure means 27 which mixes the fine particles of the iron ore separated from the iron ore in separator 35 with a carrier gas to form a mixture and applies a pressure to the mixture. The mixture is blown into furnace 10 through side tuyeres 25 and bottom tuyeres 26. Switch-over valve 41 and shut-off valve 42 are provided to use the exhaust gas generated from separator 35 as a process gas. It should be noted that a part of the fine particles of the iron ore can also be returned to preheat and prereduction furnace 30 as iron ore to be preheated and prereduced, although not shown in FIG. 1. Furthermore, in view of making use of heat, it is effective to arrange a preheater instead of separator 35, and to preheat the iron ore. As the carrier gas, a gas selected from the group consisting of Ar, $N_2$, CO, $CO_2$ and a process gas can be used.

Secondly, a method for smelting reduction of iron ore which is used in an apparatus for smelting reduction as explained in the foregoing will be described. Iron ore, as raw material, is charged into preheat and prereduction furnace 30 from said material feeder (not shown) and, after being preheated and prereduced in furnace 30, the iron ore is charged, by gravity, into smelting reduction furnace 10 through second chute 14. Carbonaceous material and fluxes are also charged, by gravity, into furnace 10 through first chute 13. In the smelting reduction furnace, molten metal bath 11 and slag layer 12 are formed. An infurnace gas generated from smelting reduction furnace 10 in the slag layer 12 increases its OD by an infurnace reaction which is hereinafter explained in detail. The infurnace gas ascends up through gas exhaust pipe 15, bound for prereduction furnace 30, and this infurnace gas which will become the exhaust gas is mixed with a gas upgrading agent, which is blown into gas exhaust pipe 15 through gas upgrading tuyere 9 arranged at an upper portions of the infurnace gas to form gas exhaust pipe 15. This upgrading of the exhaust gas is also hereinafter explained in detail.

The infurnace gas produced is increased as a result of the reaction with the gas upgrading agent to form the upgraded infurnace gas. This reaction also results in decreasing the OD as expressed in the following equation:

$$OD = (H_2O + CO_2)/(H_2 + H_2O + CO + CO_2) \quad (1)$$

The infurnace gas thus upgraded is introduced, as an exhaust gas, into preheat and prereduction furnace 30. The iron ore is preheated and prereduced in the preheat and prereduction furnace, and then, is charged into the smelting reduction furnace through second chute 14. In the meantime, the exhaust gas goes into separator 35 and, after fine particles of iron ore are separated from the exhaust gas in the separator, the exhaust gas proceeds, by means of switch-over valve 41 and shut-off valve 42, on either of two courses. One of the two course is that the exhaust gas is exhausted through an ordinary gas exhauster, and the other is that the exhaust gas is used as a process gas, which is blown through side tuyeres 25 and bottom tuyeres 26 into furnace 10, to be a stirring gas or a carrier gas. Furthermore, this exhaust gas can be introduced into gas exhaust pipe 15 to be mixed with the infurnace gas exhausted from the smelting reduction furnace and can be used to control a temperature of a gas which is introduced into preheat and prereduction furnace 30.

Figure 2:
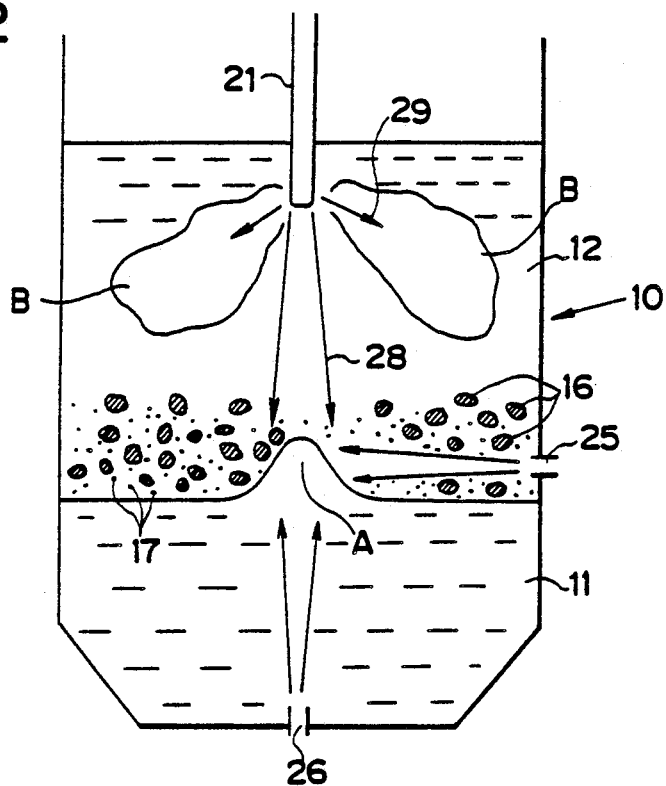
FIG. 2 is a view illustrating a gas flow in a smelting reduction furnace forming a part of the apparatus shown in FIG. 1.

Now, with specific reference to the drawings of FIGS. 2 to 6, relation between gas blow into smelting reduction furnace 10 and infurnace reaction will be examined in detail. FIG. 2 schematically illustrates a behaviour of gas blown through side tuyeres 25 and bottom tuyeres 26 shown in FIG. 1. In FIG. 2, arrows 28 and 29 illustrated below oxygen lance 21, each, show directions of oxygen gas injected respectively through decarburizing nozzles 22 and post-combustion nozzles 23. DC $O_2$ denotes oxygen gas blown through the decarburizing nozzles and PC $O_2$ oxygen gas blown through the post-combustion nozzles. Throughout the reduction operation, gas blow operation through oxygen lance 21, side tuyere 25 and bottom tuyere 26 is carried out from the beginning to the end of the operation. The gas blow through the side tuyeres and the bottom tuyeres is co-worked to diffuse molten metal into slag, and resultantly, the gas blow increases drastically the reduction speed.

As mentioned in the beginning of the detailed description, based on the finding that reduction of iron ore existing in slag layer 12 proceeds mostly by making use of $\underline{C}$ contained in molten metal as a reducing agent, the present invention intends to diffuse molten metal actively into the zone where iron ore is floating in a lower portion of the slag layer by means of strong stirring to raise the reduction speed. For this purpose, a swollen portion of molten metal (shown by A in FIG. 2) is formed on the surface of the molten metal by blowing a stirring gas through bottom tuyere 26 and simultaneously, a stirring gas is blown in through side tuyere 25 so as to have at least a part of the side blown stirring gas hit portion A. By this side blow gas, molten metal at the swollen portion of A is splashed into the slag. An apparent specific gravity of the slag ranges normally 0.1 to 0.5, while a bulk specific gravity of the iron ore ranges approximately 2 to 5. Consequently, iron ore 16 contained in the slag is concentrated in a lower portion of slag layer 12 floating therein. When the swollen portion of A of the molten metal is splashed by means of the side blown stirring gas, splashed molten metal 17 is diffused into a zone of a lower portion of slag layer 12. $\underline{C}$ contained in the splashed molten metal reduces the iron ore. Thus, a high reduction speed is performed. To obtain such an effect, it is preferable that the side blowgas hit portion A of the molten metal and for the bottom blow gas and the side blow gas to cross at right angles to each other as much as possible. In the horizontal direction, side tuyeres 25 and bottom tuyeres 26 are placed so as to satisfy a positional relation as shown in (a) or (b) of FIG. 3.

Figure 3A:
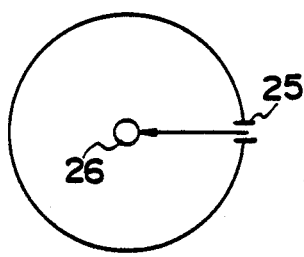
FIG. 3 is a view illustrating a position relation between side tuyeres and bottom tuyeres of the present invention.
Figure 3B:
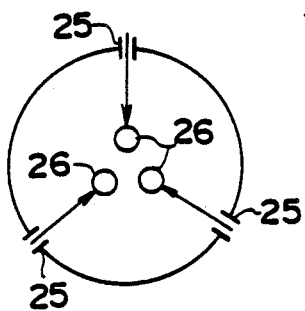

FIG. 3 (a) illustrates a positional relation in case that one side tuyere 25 and one bottom tuyere 26 are used, and FIG. 3 (b) illustrates a positional relation in case that three side tuyeres 25 and three bottom tuyeres 26 are used. In this FIG. 3, arrows show directions of gas blown through side tuyeres 25. Of course, the number and the position of side tuyeres 25 and bottom tuyeres 26 are not always subject soley to those shown in FIG. 3. The number is determined, depending on the capacity of the smelting reduction furnace in use and an amount of production thereof. Furthermore a large amount of gas is required to beblown through both of side tuyeres 25 and bottom tuyeres 26. The amount of the gas blows is determined, depending on an amount of molten metal and a depth of the molten metal. In addition to the diffusion work, the side blow gas stirs an upper portion of slag layer where a zone of the post combustion is formed. This is also hereinafter detailed.

Gas blown-in through side tuyeres 25 and bottom tuyeres 26 is at least one selected from the group consisting of $N_2$, Ar, CO, $CO_2$ and a process gas. $O_2$ gas, however, is never used. The reason is as follows: Firstly, if $O_2$ gas is used as the side blow gas, this involves a fundamental problem that reduction work of $\underline{C}$ contained in molten metal which has been splashed into a lower portion of slag layer 12 is impaired. Secondly, if $O_2$ gas is used as the bottom blow gas, so much CO gas is produced that the molten metal is too strongly stirred. As a result, the splash of the molten metal goes into a zone of an upper portion of the slag layer and reaches to a post-combustion zone (shown by B in FIG. 2) where combustion by PC $O_2$ takes place. Consequently, the post-combustion is impaired because $\underline{C}$ contained in the molten metal reacts with $O_2$ to be used for the the post-combustion. Furthermore, the use of $O_2$ gas for the bottom blow raises the temperature of refractory forming bottom tuyeres 26 so high that cooling gas such as $C_3H_3$ is required to be added. This addition also increases the amount of the bottom blow gas and accelerates occurrence of the splash of the molten metal excessively.

Figure 4:
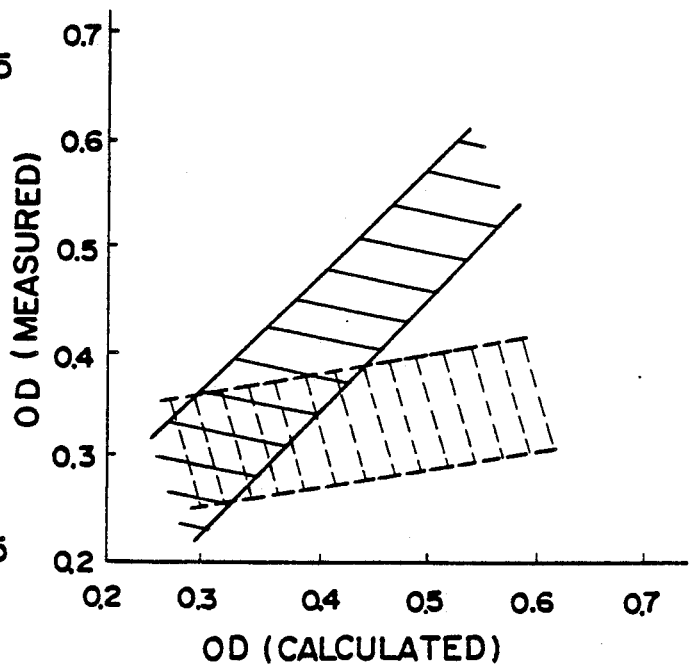
FIG. 4 is a graphic representation showing comparison of OD calculated according to the present invention with OD actually measured.

FIG. 4 is a graphic representation showing a comparison of examples of the present invention to controls of the prior art, the examples using $N_2$ gas as the bottom blow gas and the controls using $O_2$ gas in stead of $N_2$ gas as the bottom blow gas. Namely, in this graph, the OD measured which is represented by the ordinate corresponds to an OD which is obtained from the formula (1) hereinbefore using the analysis of $H_2O$, $CO_2$, $H_2$ and CO as found in the exhaust gas. On the other hand, the OD which is represented by the abscissa is given by formula (2):

$$OD = [PC\ O_2/(DC\ O_2 + PC\ O_2 + O_2 \text{ in Iron ore} + \quad (2)$$
$$O_2 \text{ in Carbonaceous Material} + \text{Water Adhered to Material} +$$
$$\tfrac{1}{2} \cdot O_2 \text{ in Carbonaceous Material})]$$

This is based on the assumption that the numerator "PC $O_2$" is completely consumed in the post-combustion and that all of $O_2$ blown in the smelting reduction furnace is discharged, as an exhaust gas, out of the smelting reduction furnace. In case of the controls, $O_2$ gas introduced by bottom blow is included in DC $O_2$. OD determined on a theoretically calculated basis is gained, by means of formula (2), from measured amount of DC $O_2$ and PC $O_2$ and amount of $O_2$ and $H_2$ included in raw material which is obtained by analysis. When as seen from the examples, a measured OD is nearly equal to a calculated OD, it can be said that the post-combustion ratio is good. As clearly seen from FIG. 4, the post-combustion of the examples is good, but that of the controls is poor.

In the present invention, the post-combustion zone is formed mainly within slag i.e. zone B and the high degree of post-combustion is performed. In this way, by a method wherein the post-combustion zone is formed and the slag is strongly stirred by the side blow gas, it can be attained that the high degree of post-combustion is procured and still the high heat transfer is obtained. Consequently, the post-combustion oxygen gas needs to be blown mainly into slag existing in the post-combustion area of zone B.

It is specifically required that the level of the top-blow lance be set so as to have an appropriate level height relative to a molten metal level and a slag level. In other words, if nozzles of oxygen lance 21 are excessively higher than the upper surface of slag layer 12, the post-combustion zone fails to be formed in the slag layer and the heat transfer efficiency is lowered, while if the nozzles are excessively low, the post-combustion zone fails to be appropriately formed. The lowest level of the nozzles of the oxygen lance is equal to the lower side of the slag layer.

Figure 5:
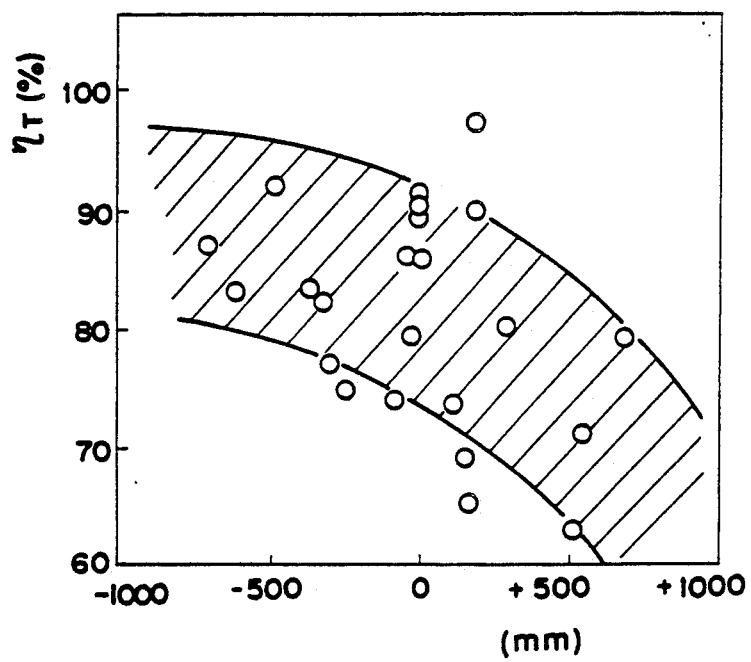
FIG. 5 is a graphic representation showing a relation of a heat transfer efficiency to a level height of an oxygen lance of the present invention.
Figure 6:
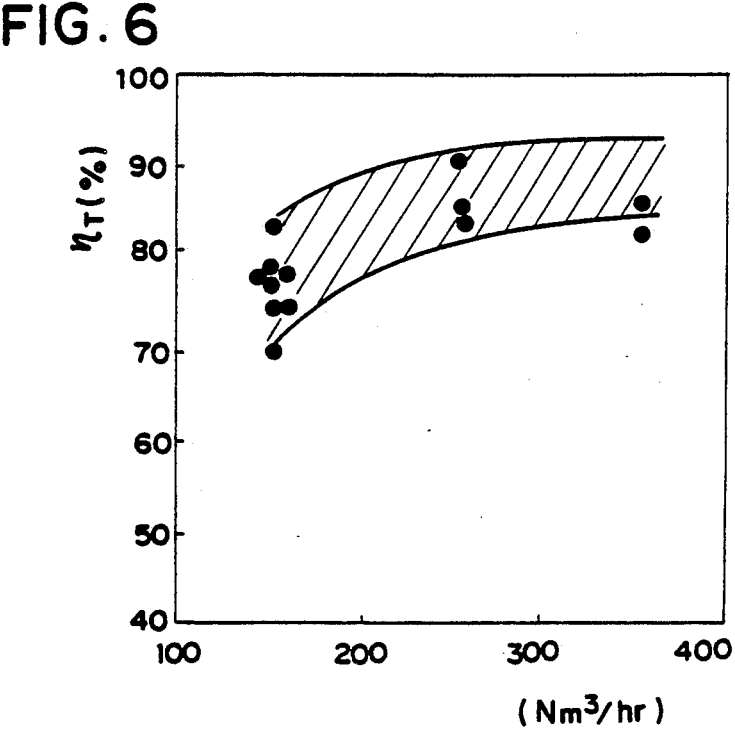
FIG. 6 is a graphic representation showing a relation of a heat transfer efficiency to a side blow gas of the present invention.

FIG. 5 shows a relation of a height between the top end of oxygen lance and the upper surface level of slag to the heat transfer efficiency according to the present invention this shows that if the top end of the oxygen lance is too high from slag surface, the good heat transfer efficiency cannot be obtained. FIG. 6 shows a relation of a side blow gas amount to the heat transfer efficiency. It is recognized from FIG. 6 that a good heat transfer efficiency can be obtained by blowing a large amount of the side blow gas through side tuyeres 25 and stirring strongly the slag layer. The results shown in FIGS. 5 and 6 were obtained from an operation wherein a smelting reduction furnace with 50 tons in capacity was employed and molten metal was produced at a rate of 28 t/hour.

According to the present invention, thanks to the high heat efficiency, a high reduction rate can be gained by means of increasing the OD as mentioned above. In addition to this, thanks to the raise of the OD, the addition amount of carbonaceous material can be reduced. Resultantly, a unit consumption of carbonaceous material can be saved and, at the same time, P content in molten metal can be reduced since most of P in the molten metal is brought with the carbonaceous material. Furthermore, when the OD becomes high, desulferization by evaporation is activated, and therefore, S content in the molten metal can be reduced. From these view points, the OD is set preferably to be 0.5 or more. If the OD is 0.7 or more, the reduction reaction in the smelting reduction furnace is promoted and the prereduction furnace becomes remarkably needless.

In the manner as mentioned above, gas with an increased OD i.e., gas of low calories is upgraded, by means of blowing powdery carbonaceous material, which is an upgrading agent, together with a carrier gas through gas upgrading tuyeres 9 placed at an upper portion of gas exhaust pipe 15, into an upgraded gas having a less than 0.5 OD. This upgraded gas is introduced into preheat and prereduction furnace 30 and iron ore can be efficiently prereduced. The carrier gas is at least one selected from the group consisting of $N_2$, Ar, CO, $CO_2$ and a process gas. Powdery carbonaceous material as mentioned above, which is a gas upgrading agent, is usually blown in together with a carrier gas. Depending on a particle size of carbonaceous material, however, they can be charged, by gravity, into gas upgrading tuyeres 9. This can also apply to charging through an upper portion of the smelting reduction furnace. It is recommendable that as said gas upgrading agent, fuel oil or steam can be used, by taking into consideration conditions such as cost, a structure of the gas upgrading tuyeres and the exhaust gas.

In this embodiment, as mentioned above, gas upgrading tuyeres 9 are placed at an upper portion of the smelting reduction furnace. This arrangement enables a lot of positions of the blow inlets to freely be selected vertically along the wall of gas exhaust pipe 15, and therefore, amount of blow-in gas can be easily controlled. Furthermore, when those tuyeres are placed at an upside wall and upper portion side walls of the smelting reduction furnace, those portions of the smelting reduction furnace, gas exhaust pipe and other attachments thereto can be protected from being overheated since the blow-in of the gas upgrading agent lowers the temperature of the exhaust gas. When the preheat and prereduction furnace is of fluid bed type, by means of blowing the gas upgrading agent into a wind box, the gas upgrading agent and the exhaust gas from the smelting reduction furnace are well mixed in the wind box, and the upgrading of the exhaust gas is efficiently carried out.

Lastly, specific values obtained from the results of the operation of the examples of the present invention are listed in Table 1. These examples were obtained on the same conditions as those of FIGS. 5 and 6. In the Table, comparison of a case of the gas upgrading being carried out and a case of the gas upgrading not being carried out is shown. The respective OD values were calculated by formula (2) given hereinbefore, using the compositions of the exhaust gases in table 1. The OD value of the upgraded gas is 0.24, while the OD of the non-upgraded gas is 0.51. It is clear that the upgraded gas has an OD value much lower than that of the non-upgraded gas. Furthermore the temperature of the upgraded gas is lower than that of the non-upgraded gas.

While the present invention has been particularly shown and described with reference to preferred embodiments thereof, it will be understood by those skilled in the art that the foregoing and other changes in form and details can be made therein without departing from the spirit and scope of the present invention.

TABLE 1

|  | Non-upgraded Gas | Upgraded Gas |
|---|---|---|
| Coal | 328 kg/min (in molten | 225 kg/min (in molten |

TABLE 1-continued

|  | Non-upgraded Gas | Upgraded Gas |
|---|---|---|
|  | metal bath) | metal bath) 76 kg/min (for upgrading) |
| Iron Ore | 724 kg/min (in molten metal bath) | 720 kg/min (in molten metal bath) |
| $CaCO_3$ | 72 kg/min (in molten metal bath) | 74 kg/min (in molten metal bath) |
| $O_2$ | 232 $Nm^3$/min | 165 $Nm^3$/min |
| Exhaust Gas |  |  |
| CO | 44% | 68% |
| $CO_2$ | 34% | 14% |
| $H_2$ | 5% | 8% |
| $H_2O$ | 17% | 17% |
| Temp. | 1,740° C. | 1,650° C. |

What is claimed is:

1. A method for smelting reduction of iron ore in a smelting reduction furnace comprising preheating and prereducing iron ore in at least one preheat and prereduction furnace by contacting said iron ore with an infurnace gas exhausted from said smelting reduction furnace;

charging the preheated and prereduced iron ore, carbonaceous material and flux into a smelting reduction furnace containing molten metal in the bottom thereof and a slag layer on said molten metal;

blowing decarburizing oxygen and post-combusting oxygen through a tip of a top blown oxygen lance into the smelting reduction furnace to reduce the preheated and prereduced iron ore to molten metal and to melt the flux into slag, the decarburizing oxygen being blown through decarburizing nozzles placed at a central portion of the tip of the top blown oxygen lance and the post-combusting oxygen being blown through post-combustion nozzles placed at the central portion and spaced outwardly from the decarburizing nozzles; the tip of the top blown oxygen lance being positioned between the upper surface and the lower surface of said slag layer;

blowing in stirring gas through at least one side tuyere placed in a side wall of the smelting reduction furnace and at least one bottom tuyere placed in the bottom of the smelting reduction furnace; said stirring gas blown through said at least one bottom tuyere passing upward through said molten metal and causing a portion of the upper surface of said molten metal to swell upwardly, at least part of said stirring gas blown through the at least one side tuyere being directed at said upwardly swollen portion of the molten metal to agitate said molten metal and the slag layer to cause droplets of said molten metal to move into said slag layer;

the stirring gas being at least one gas selected from the group consisting of Ar, $N_2$, CO, $CO_2$ and process gas;

controlling flow rates of the post-combusting oxygen and the stirring gas to form an infurnace gas in the smelting reduction furnace which has an oxidation degree of from 0.5 to 1.0, said oxidation degree being determined by the formula:

$(H_2O+CO_2)/(H_2+H_2O+CO+CO_2)$.

2. $OD = (H_2O + CO_2)/(H_2 + H_2O + CO + CO_2)$. The method of claim 1, wherein said oxidation degree is from 0.7 to 1.0.

3. The method of claim 1, which comprises the additional step of removing dust from said infurnace gas without losing the heat of said infurnace gas outside of said smelting reduction furnace and then, using said infurnace gas to contact said iron ore in said preheat and prereduction furnace.

4. The method of claim 1, which comprises the additional step of preheating said iron ore by contact with a gas discharged from the preheat and prereduction furnace, and the preheated iron ore being charged into the preheat and prereduction furnace.

5. The method of claim 1, which comprises the additional step of upgrading said infurnace gas into an upgraded gas having an oxidation degree of less than 0.5 and using said upgraded gas for preheating and prereducing said iron ore in a preheat and prereduction furnace.

6. The method of claim 5, wherein the step of upgrading said infurnace gas comprises upgrading the infurnace gas by contact with at least one gas upgrading agent selected from the group consisting of carbonaceous material, steam and fuel oil.

7. The method of claim 5, wherein the step of upgrading said infurnace gas comprises blowing said upgrading gas through gas upgrading tuyeres positioned in said smelting reducing furnace at a level above the slag layer.

8. The method of claim 5, wherein the step of blowing said upgrading gas includes blowing said upgrading gas together with a carrier gas through gas upgrading tuyeres.

9. The method of claim 8, wherein said carrier gas includes at least one gas selected from the group consisting of Ar, $N_2$, CO, $CO_2$ and process gas.

10. The method of claim 5, wherein the step of the upgrading infurnace gas comprises blowing a gas upgrading agent through gas upgrading tuyeres positioned in a gas exhaust pipe transferring the infurnace gas from the smelting reduction furnace to the preheat and prereduction furnace.

11. The method of claim 5, wherein the step of the upgrading the infurnace gas includes blowing a gas upgrading agent through gas upgrading tuyeres placed at the preheat and prereduction furnace.

12. The method of claim 5, wherein said upgraded gas having an oxidation degree of 0.5 or less is at a temperature of 300° to 1300° C.

13. The method of claim 1, wherein at least part of said stirring gas blown through said at least one side tuyere which is directed at said upwardly swollen portion of said molten metal contacts said upwardly swollen portion of said molten metal.

14. The method of claim 10, wherein at least part of said stirring gas blown through said at least one side tuyere which is directed at said upwardly swollen portion of said molten metal contacts said upwardly swollen portion of said molten metal.

15. The method of claim 11, wherein at least part of said stirring gas blown through said at least one side tuyere which is directed at said upwardly swollen portion of said molten metal contacts said upwardly swollen portion of said molten metal.

16. The method of claim 12, wherein at least part of said stirring gas blown through said at least one side tuyere which is directed at said upwardly swollen portion of said molten metal contacts said upwardly swollen portion of said molten metal.

17. The method of claim 3, wherein at least part of said stirring gas blown through said at least one side tuyere which is directed at said upwardly swollen portion of said molten metal contacts said upwardly swollen portion of said molten metal.

18. The method of claim 4, wherein at least part of said stirring gas blown through said at least one side tuyere which is directed at said upwardly swollen portion of said molten metal contacts said upwardly swollen portion of said molten metal.

19. The method of claim 5, wherein at least part of said stirring gas blown through said at least one side tuyere which is directed at said upwardly swollen portion of said molten metal contacts said upwardly swollen portion of said molten metal.

20. The method of claim 6, wherein at least part of said stirring gas blown through said at least one side tuyere which is directed at said upwardly swollen portion of said molten metal contacts said upwardly swollen portion of said molten metal.

* * * * *